Oct. 10, 1961 F. D. BARBER 3,003,832
SEALED JOURNAL BEARING FOR RAILWAY CAR AXLE
Filed Oct. 28, 1957 2 Sheets-Sheet 1
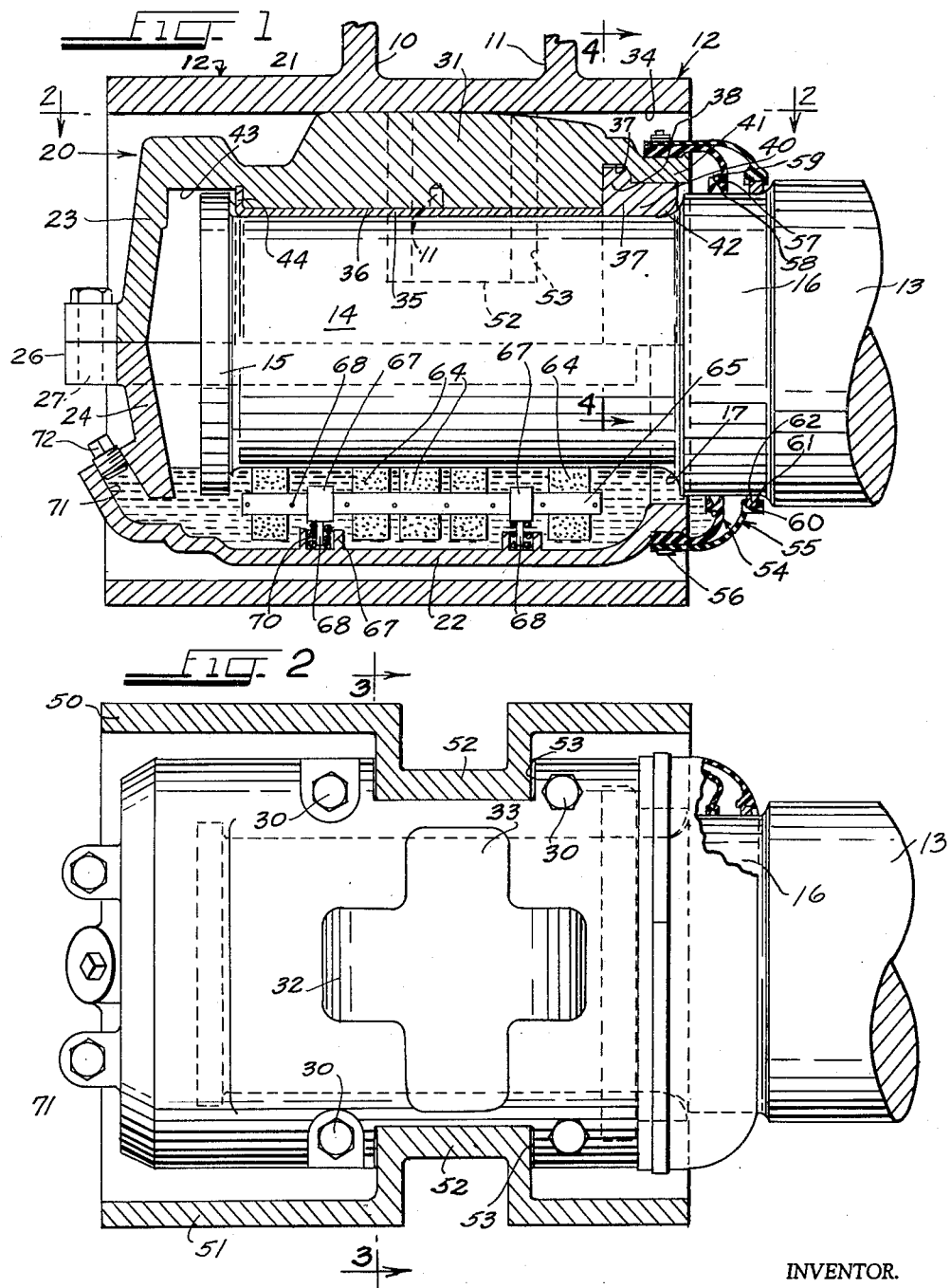
INVENTOR.
FRANKLIN D. BARBER
BY
Harvey M. Gillespie
ATTY.

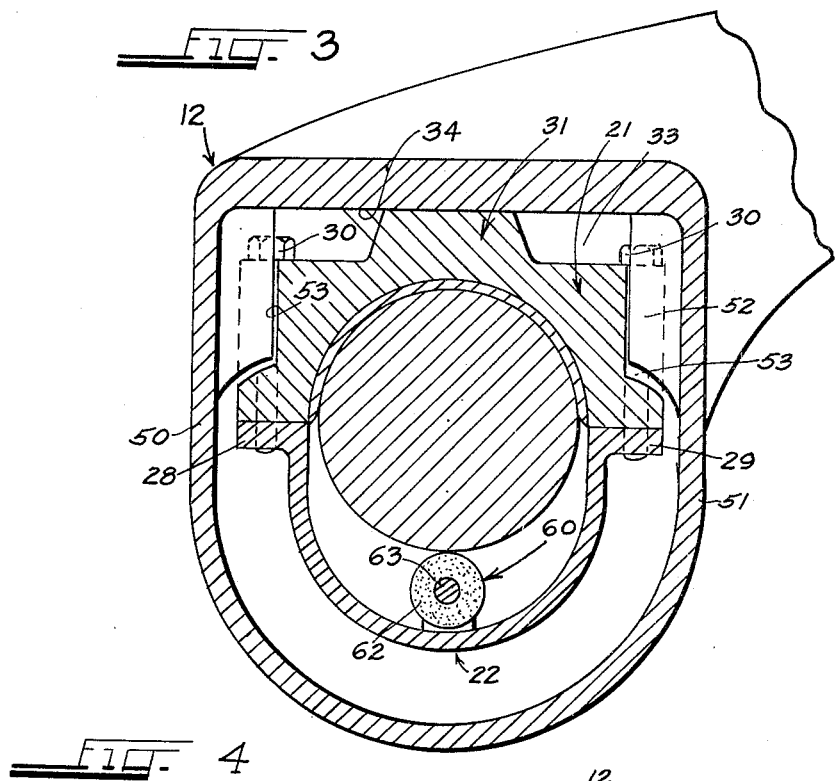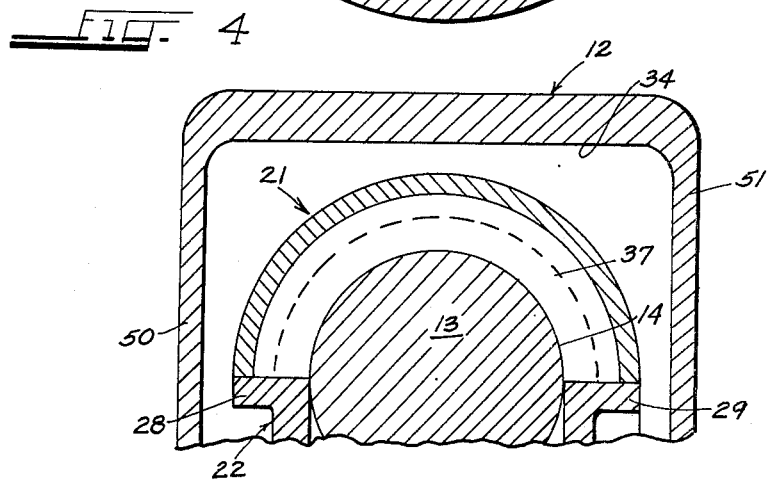

United States Patent Office 3,003,832
Patented Oct. 10, 1961

3,003,832
SEALED JOURNAL BEARING FOR RAILWAY CAR AXLE
Franklin D. Barber, Flossmoor, Ill., assignor to Standard Car Truck Company, Chicago, Ill., a corporation of New Jersey
Filed Oct. 28, 1957, Ser. No. 692,828
2 Claims. (Cl. 308—91)

The present invention relates to improvements in sealed journal bearings for railway car axles and particularly to a type of combination bearing and lubricant reservoir constructed for use in connection with railway freight car axle journals.

The type of sealed journal bearing structure to which the present invention appertains, comprises a sectional casing including an upper section and a lower section which, when secured together, provide an enclosure for an axle journal. The upper section is positioned above the axle journal and is interlocked with a housing which forms a part of a car truck side frame. The lower section constitutes a reservoir for containing a body of lubricant for application to the journal either by direct contact therewith or by suitable transfer mechanism. A thin liner of bearing metal is removably attached to the upper section of the casing and has direct bearing contact with the journal.

The said casing sections together with the liner of bearing material stops short of the inner limit of the journal to provide sufficient space to permit the lubricant sealing ring to be located on the highly polished surface of the journal at a location intermediate the journal bearing and the conventional dust guard bearing surface of the axle.

The above type of sealed bearing has not been entirely satisfactory, since the reduced length of the bearing casing and the bearing liner necessarily reduces the area of the bearing surface in contact with the journal and also makes it necessary to provide thrust bearings for engaging the outer unpolished surface of the journal collar as well as the inner polished surface thereto to limit axial movement of the journal relative to the journal bearing.

The principal object of the present invention is to provide improvements in bearing assemblies of the above type, whereby the journal bearing will have bearing contact with the journal throughout its length and the inner face of the journal collar and the conventional filet at the junction of the journal with the dust guard bearing surface function as opposed thrust bearings to limit the axial movement of the journal relative to the journal bearing.

According to the present invention, the upper and lower sections of the bearing casing extend throughout the entire length of the axle journal. At the outer end of the liner of bearing metal, the semi-circular thrust bearing is inserted in a recess formed in the interior wall of the upper section of said casing so as to abut against the inner face of the journal collar. A relatively thick semi-circular bearing element is fitted into an arcuate retaining recess formed in the upper section of said casing. This bearing element, in addition to providing a curved thrust bearing surface for engaging the filet at the junction of the journal and the dust guard bearing surface, also provides a bearing surface of substantial area for bearing at the top surface of the journal adjacent said filet.

The inner end of said casing is sealed against loss of lubricant and the ingress of foreign matter by the provision of a plurality of sealing rings positioned to embracingly engage the said dust guard surface of the axle.

Other objects and advantages of the invention, not at this time enumerated, will become more readily apparent as the following description ensues.

In the accompanying drawings forming a part of this specification, a preferred embodiment of this invention has been shown.

In these drawings:

FIG. 1 is a longitudinal sectional view taken substantially centrally through a sealed bearing structure made in accordance with the principles of the present invention and showing the same operatively installed on an axle journal of a railway car and operatively associated with a side frame of the railway car truck.

FIG. 2 is a sectional view taken substantially along the line 2—2 of FIG. 1.

FIG. 3 is a sectional view taken along the line 3—3 of FIG. 2, and

FIG. 4 is a sectional view taken substantially along the line 4—4 of FIG. 1.

Referring now to the drawings in detail, the side frame of a railway car truck is designated at 10 and has integrally cast or otherwise formed therewith a generally tubular retaining housing 12 into which one outer end of a railway car wheel axle 13 extends. The journal 14 of the axle 13 is completely disposed within the confines of the retaining housing 12 and the outer end thereof is formed with the usual thrust collar 15. The inner end of the journal 14 merges with the usual cylindrical dust guard surface 16 of the axle through a curved shoulder 17 and thus it will be observed that the axle 13 and bearing portion thereof are of conventional design and requires no modification thereof for proper cooperation with the journal bearing assembly of the present invention. The retaining housing 12 is adapted to receive and retain therein a sealed journal bearing assembly designated in its entirety at 20 constituting, in the main, a major portion of the present invention. The assembly 20 constitutes the sole means whereby the side frame together with its associated retaining housing 12 are supported on the rotating axle journal 14. Except for the modified form the retaining housing 12, the car truck together with its side frame 10 is of conventional construction and requires no modification insofar as the application and use of the bearing assembly 20 to the journal construction of the wheel axle 13 is concerned. The retaining housing 12 occupies a position ordinarily occupied by the conventional journal box construction and for which it has been substituted in the present embodiment of the invention.

The bearing assembly 20 involves in its general organization a two-part separable casing which encompasses the journal 14 and its associated structure. It includes an upper section 21 and a lower section 22. The two sections 21 and 22 are each generally semi-cylindrical in configuration and the upper section is formed with a generally radially extending outer wall 23 which cooperates with a similar radial outer wall 24 formed on the lower section 22 to define an end wall closure for the casing when the two sections are assembled upon each other. The upper and lower sections 21 and 22 of the bearing casing are formed with a pair of cooperating ears 25 and 26 respectively through which clamping bolts 27 extend for retaining the two sections in their assembled relationship. The lower section 22 is formed with a pair of radial side flanges 28 and 29 which extend along the upper longitudinal edges thereof and on which edges and side flanges the lower longitudinal edges of the upper section are adapted to seat. A series of clamping bolts 30 project downwardly through the upper section 21 on opposite sides thereof and are threadedly received in the flanges 29 to further retain the two sections in their assembled relationship.

The upper section 21 of the bearing assembly is provided with a medial thickened portion 31, which, as best seen in FIG. 2, is generally of X-shaped horizontal cross section, which is to say that the thickened portion 31 consists of two intersecting ribs 32 and 33 on the upper section of the casing. This section of the casing together with the integrally formed thickened portion 31 thereon, in effect constitutes the bearing "brass" ordinarily associated with railway car journals and the upper surfaces of the ribs 32 and 33 are adapted to bear directly against flat underneath surface 34 of the bearing housing 12, whereby the housing and its integrally formed side frame 10 are supported on the upper section 31 of the composite bearing casing.

A curved liner 35 of bearing material rests on the top of the journal 14 and underlies the semi-cylindrical surface 36 of the upper section 21 of the casing. It is secured to the section 21 by a stud 11 and is coextensive with a major longitudinal extent of the journal 14, but terminates short of the inner end of the journal. A thrust bearing in the form of a half-ring is interposed between the inner end of the liner 35 and the shoulder 17. The half-ring 37, which may be formed of brass or other bearing metal is generally of L-shape in cross section as seen in FIG. 1 and is provided with a radial flange portion 38 which nests within an arcuate recess 39 formed internally adjacent the rear end of the casting 31, and with a longitudinally extending flange portion 40 which nests within the forward thickened rim portion 41 of the casting 31. The rear end of the bearing member 37 is curved as at 42 to accommodate the curvature of the dust guard shoulder 17. This curved portion 42 of the bearing member 37 is adapted to receive the axial thrust of the railway car axle 13 during relative shifting movement between this axle and the bearing casing. The outer region of the upper section 31 of the said casing is formed with a relatively wide internal arcuate recess 43 to accommodate the thrust collar 15 at the end of the axle, and an arcuate thrust liner or bearing member 44 preferably a flange formed on the outer end of the liner 35 is interposed between the collar 15 and the outwardly facing side wall of the recess 43. The liner 44 is adapted to receive the inward thrust of the journal collar 15 during relative axial movement between the axle and the composite reservoir housing. The thrust bearing 44 and the liner are held against circumferential shifting by means of the stud 11 and the thrust ring segment is held from similar shifting by virtue of its ends which are formed to bear against the flange portions 28 and 29 of the lower section 22 of the casing when the sections are assembled. The lower edges of the liner 35 are preferably champered as shown at 35a to provide an easy entrance of the lubricant between the journal and said liner 35.

Referring now to FIGS. 2 and 3, means are provided for providing an interlock between the composite bearing casing and lubricant reservoir 21, 22 and the tubular retaining housing 12 whereby the casing may be centered longitudinally within the housing against axial shifting movement relative thereto. Accordingly, the vertical side walls 50 and 51 of said housing are provided with inwardly offset portions 52 providing in effect a pair of vertical ribs which extend into recess pockets 53 provided in the opposite sides of the upper section 31 of the bearing casing (see also FIG. 1). The ribs afforded by the offset portions 52 interlock with the grooves 53 into which they extend and constrain the bearing assembly as a whole against both transverse and longitudinal shifting movement within the retaining housing 12.

At the rear end of the lubricant reservoir 21, a pair of flexible lip seals are provided including an inner seal assembly 54 and an outer seal assembly 55. The inner seal assembly is in the form of a ring of flexible elastomeric material which may be formed of synthetic rubber which is impervious to the deleterious action of hydrocarbon oils. The outer sealing lip assembly 55 may likewise be in the form of elastomeric ring, the inner ring 54 being telescopically received within the outer ring and the two rings being suitably clamped to the inner rim portion of the composite casing 21, 22 by means of a split clamping band 56 or the like. The rings 54 and 55 project rearwardly of the composite casing and the free edge region of the outer ring 54 is formed with a reentrant thickened portion 57 which is grooved to provide a pair of thin sealing lips 58 which are adapted to closely hug and bear against the dust guard bearing portion 16 of the railway car axle 13. A garter spring 59 surrounds the reentrant portion 57 and applies resilient sealing pressure to the same. The free edge region of the inner sealing ring assembly 55 extends beyond the edge region of the outer sealing member and has a thickened rim 60 which is grooved as at 61 to receive therein a suitable sealing ring 62 which closely hugs the cylindrical dust guard bearing 16 of the axle 13. The outer lip seal assembly 54 is essentially an oil seal for preventing egress of lubricant from the composite casing 21, 22 axially along the annulus between the casing and shaft at the rear end of the former while the lip seal assembly 55 is essentially a dust guard for excluding dust and other foreign material from entering the bearing casing through this annulus.

As best seen in FIGS. 1 and 3, the lower section 22 of the combined journal bearing and lubricant reservoir supports at its bottom region a lubricant transfer assembly designated in its entirety at 63, the assembly consisting of a series of lubricant transfer rollers 64 appropriately spaced on a common floating supporting shaft 65. The rollers 64 are maintained in their spaced relationship along the shaft 65 by means of pins 66 and these rollers are individually freely rotatable on the shaft. The shaft 65 is carried in a pair of spaced vertically movable supporting collars 67, each of which is formed with a hollow shank portion 68 which is guided for vertical movement in a surrounding centering boss 69. A spring 70 disposed within the shank 68 normally urges the supporting collar 67 upwardly so that the various lubricant transfer rollers 64 are yieldingly urged into engagement with the underneath surface of the rotating journal 14. The rollers 64 are preferably formed of relatively compact felt or other fabric material in order that they may effect their lubricant transfer action more expeditiously inasmuch as the interstices of the fabric material will attract the lubricant by capillary action.

It will be seen from the foregoing description that the invention herein described provides a novel and useful sealed bearing and lubricant reservoir for railway car journals. Since the retaining housing in which the composite bearing and lubricant reservoir is received is of open-ended construction and of appreciable overall depth, the composite bearing and reservoir structure may be assembled on the journal portion of the railway car axle through the outer open end of the housing with comparative ease. In effecting such assembly the upper section 21 may be slid longitudinally into the housing 12 through the outer open end thereof and the pockets or grooves 53 thereof vertically aligned with the ribs provided by the offset portions 52 on the housing 12. The upper casing part 21 may then be moved vertically into position so that the thickened supporting portion 31 thereof engages the underneath side 34 of the housing, after which the lower section 22 may be moved into position through the outer open end of the housing and properly aligned with the upper casing part 21. The clamping bolts 30, which previously have been placed in position through the upper section 21 are then threaded into the threaded holes provided for them in the ears 26 and flanges 28 and 29 respectively and thereafter the bolts may be tightened. Because of the fact that both ends of the housing 12 are open, there is ample clearance for insertion of a wrench or similar tightening tool into the housing 12 through either end thereof for cooperation with the heads of the various bolts 30. The disassembly of the bearing casing for purposes of removal during reservoir substitution operations is effected by a reversal of the assembly operation just described.

After the bearing assembly has been installed within the housing 12 by the assembly operation set forth above, the same may be filled with a suitable lubricant through a filling opening 71 (FIGS. 1 and 2) provided in the front wall 24 of the lower casing part 22 adjacent the bottom thereof, the opening 71 being adapted to threadedly receive therein a closure plug 72.

I claim:

1. The combination of a railway car axle journal provided at its outer end with a thrust collar and at its inner end with a thrust shoulder the perimeter of which defines a circumferential dust guard surface, a combined journal bearing and lubricant reservoir assembly comprising an elongated rigid casing closed at one end and open at the other and enclosing said journal and its thrust collar, the said rigid casing being provided with an integral bearing seat portion supported on the journal between said thrust collar and said thrust shoulder with its outboard end positioned in close abutting relation to said thrust collar and having its inboard end spaced axially from said thrust shoulder and formed with a radial recess of L-shaped configuration in axial cross-section and defined in part by said journal, means for extending the bearing surface area of said bearing seat portion comprising a semi-circular thrust ring seated upon said journal within said recess and conforming in shape to the recess with its outboard end abutting against a vertical face of said recess and with its inboard end positioned to abut against said thrust shoulder, a housing for said combined journal and lubricant reservoir having its inboard end open and terminating in substantial vertical alignment with the inner end of said combined journal bearing and lubricant reservoir and overlying only a slight marginal portion of said dust guard surface, and resilient means including a pair of flexible tubular elements secured to the open end of said combined journal bearing and lubricant reservoir and projecting in an axial direction therefrom through the open end of said housing and into resilient sealing engagement with said dust guard surface at locations spaced from each other lengthwise of the axle.

2. A combination structure according to claim 1 in which the journal bearing portion of the combined journal bearing and lubricant reservoir is provided with a liner of bearing metal removably secured thereto and provided at one end with a radially extending flange defining a thrus bearing for engaging the inner face of said thrust collar.

References Cited in the file of this patent

UNITED STATES PATENTS

| | | |
|---|---|---|
| 2,177,441 | Pesarese | Oct. 24, 1939 |
| 2,670,998 | Barber | Mar. 2, 1954 |
| 2,711,353 | Barber | June 21, 1955 |
| 2,855,248 | Rovtar | Oct. 7, 1958 |
| 2,923,581 | Wahrenberger et al. | Feb. 2, 1960 |